(12) United States Patent
Shepherd

(10) Patent No.: US 6,918,136 B2
(45) Date of Patent: Jul. 12, 2005

(54) CONTROL OF INTERCONNECTED AUDIO/VIDEO DEVICES

(75) Inventor: Nicoll B. Shepherd, Coulsdon (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 849 days.

(21) Appl. No.: 09/773,419

(22) Filed: Feb. 1, 2001

(65) Prior Publication Data

US 2001/0014972 A1 Aug. 16, 2001

(30) Foreign Application Priority Data

Feb. 15, 2000 (GB) .............................................. 0003306

(51) Int. Cl.[7] .......................... H04N 7/16; H04N 7/18; H04N 5/44; H04N 5/50; G09G 5/00
(52) U.S. Cl. ......................... 725/141; 725/80; 725/81; 725/85; 725/139; 348/734; 348/569; 348/563; 348/570; 710/15; 710/16; 345/169
(58) Field of Search .............................. 725/80, 81, 85, 725/86; 348/734, 569, 563, 570; 710/15–16; 340/3.71, 825.22; 345/158, 169

(56) References Cited

U.S. PATENT DOCUMENTS

| | | | |
|---|---|---|---|
| 4,626,848 A | 12/1986 | Ehlers | 340/825.69 |
| 5,367,316 A * | 11/1994 | Ikezaki | 345/158 |
| 5,371,553 A | 12/1994 | Kawamura et al. | 348/734 |
| 5,416,535 A | 5/1995 | Sato et al. | 348/706 |
| 5,517,257 A | 5/1996 | Dunn et al. | 348/734 |
| 5,537,107 A * | 7/1996 | Funado | 340/825.72 |
| 5,598,523 A * | 1/1997 | Fujita | 715/840 |
| 5,648,824 A | 7/1997 | Dunn et al. | 348/734 |
| 5,949,407 A | 9/1999 | Sato | 345/169 |
| 5,990,890 A | 11/1999 | Etheredge | 345/347 |
| 6,020,881 A | 2/2000 | Naughton | 345/327 |
| 6,400,280 B1 * | 6/2002 | Osakabe | 340/825.25 |

FOREIGN PATENT DOCUMENTS

| | | | | |
|---|---|---|---|---|
| EP | 0390041 A2 | 10/1990 | | H04B/1/20 |
| EP | 0507314 A1 | 10/1992 | | H04N/5/445 |
| EP | 0535749 A2 | 4/1993 | | H02J/13/00 |
| EP | 0883320 A2 | 12/1998 | | H04Q/9/00 |

* cited by examiner

Primary Examiner—John Miller
Assistant Examiner—Michael R Shannon

(57) ABSTRACT

A local communication system comprises a plurality of devices interconnected for data communication. One of the devices is a display device arranged to display data from one or more other devices of the system, and one of the devices is a remote control carrying a first group of controls (A . . . G) for controlling respective operational functions of a device of the system. The system is configured to identify a selected device of the system to be controlled by user operation of a remote control device, and to determine which operational functions of that selected device are missing on the remote control. For such functions, the system generates on the display device a user actuatable simulacrum of a control for that function (H, J, K, L).

10 Claims, 3 Drawing Sheets

CONTROL OF INTERCONNECTED AUDIO/VIDEO DEVICES

Figure 1:
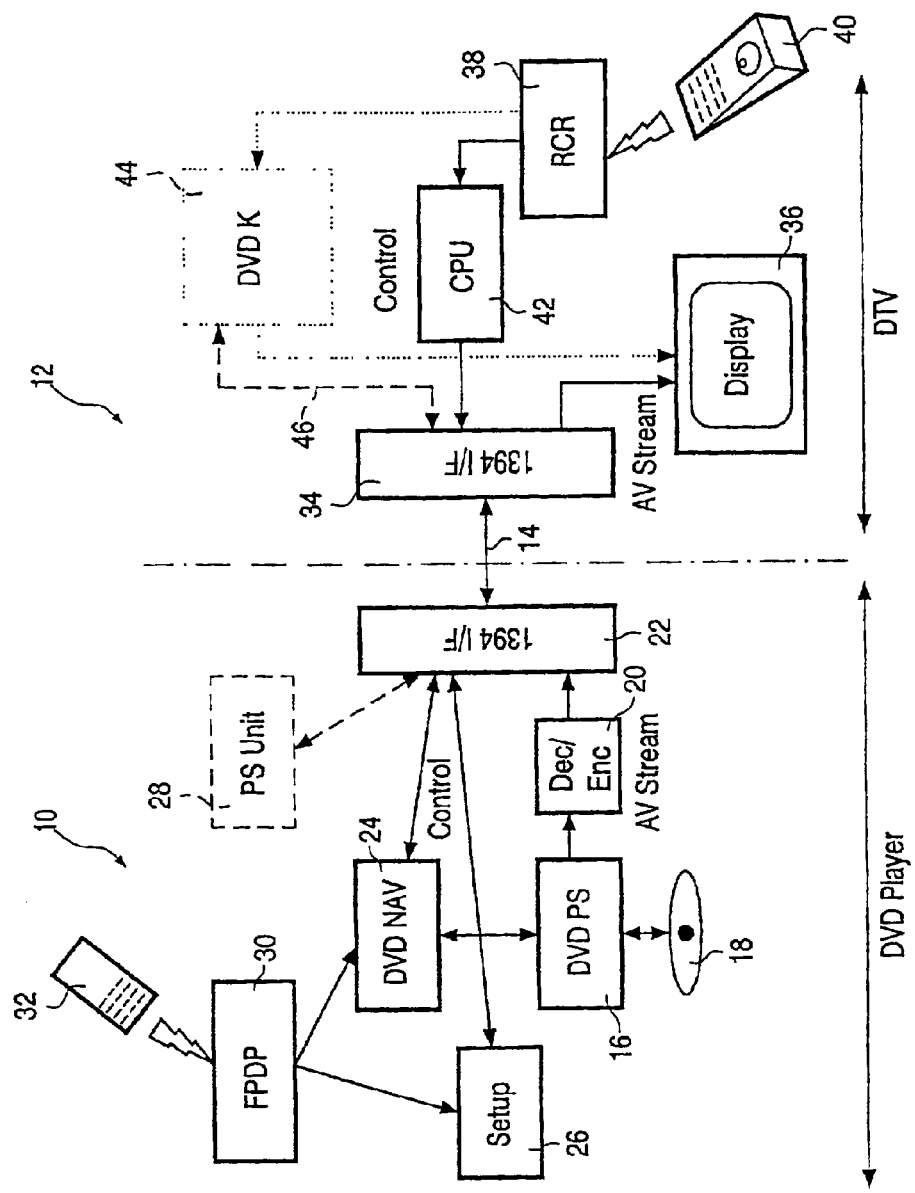

The present invention relates to systems composed of a plurality of devices clustered for the exchange of data, preferably audio and/or video data and control messages, via wired or wireless link and, in particular although not essentially, to such systems where it is desired to control different ones of the devices via a wired or wireless remote control device. The invention further relates to devices for use in such systems.

Networking or interconnection of devices has long been known and used, starting from basic systems where different system functions have been provided by separate units, for example hi-fi or so-called home cinema systems. A development has been the so-called home bus systems where a greater variety of products have been linked with a view to providing enhanced overall functionality in, for example, domestic audio/video apparatus coupled with a home security system and the use of telephone. An example of such a home bus system is the domestic digital bus (D2B), the communications protocols for which have been issued as standard IEC 1030 by the International Electrotechnical Commission in Geneva, Switzerland. The D2B system provides a single wire control bus to which all devices are interfaced with messages carried between the various devices of the system in a standardised form of data packet.

A particular problem that can occur with interconnected systems such as hi-fi and home cinema, particularly when assembled from components of different manufacturers, is the proliferation of remote control devices for controlling the respective connected units. One known way in which this problem has been tackled is by the provision of an "intelligent" remote control that can be programmed or reconfigured by a user to operate devices other than that for which it was first provided: an example of this is given in U.S. Pat. No. 4,626,848 (Ehlers).

Whilst a remote control that learns is a step forward, it encounters a further problem in terms of the number of control function keys it must carry. In effect, the problem becomes one of how to control a first device using remote control which does not have all the function keys for that device on it. For example, in the case of a digital versatile disc (DVD) player to be controlled using a remote control intended for a digital television (DTV), a DTV remote control is unlikely to have all the necessary DVD keys: while the simple Play, Stop, Fast Forward, Rewind and Record keys may be present, other DVD-specific buttons like Camera Angle will probably not be present.

Where a large number of functions are required to be controlled from a single remote device, one option for keeping the number of physical controls down is to have soft keys onto which are mapped selected ones from a specific set of functions. An example of such a control mechanism is given in U.S. Pat. No. 5,517,257 (Dunn et al) where a four-way selector device on a remote control selectively has groups of four control features assigned to it, with the current assignment at any given time being shown on a television or other display screen forming part of the controlled system. Whilst this arrangement may help to reduce the numbers of control buttons or switches on the remote control, it does require all the mappable functions to be known and pre-stored.

It is accordingly an object of the present invention to provide a networked system of devices including a facility for control of all devices through a single remote control arrangement, which arrangement is capable of ready adaptation to accommodate new devices with additional features.

In accordance with the present invention there is provided a local communication system comprising a plurality of devices interconnected for the communication of data, wherein one of said devices is a display device arranged to display data from one or more other devices of the system, and wherein one of said devices is a remote control device carrying a first group of controls for controlling respective operational functions of a device of the system, the system including:

selector means for identifying a selected device of the system to be controlled by user operation of said remote control device; and virtual control means to determine which operational functions of said selected device do not have a corresponding control on said remote control device, and generate on said display device a user actuatable simulacrum of a control means for each such operational function.

By generation of the simulacra, which may simply comprise user-selectable graphic icons representing the additional functionality, the capabilities of the remote control are effectively extended through the provision of physical controls for functions it was originally designed to support, and virtual (i.e. on-screen) controls for functions added subsequently.

Generation of the simulacrum or simulacra may be handled by the display device based on data from said selected device, or by reference to stored data, which data is accessed by reference to the device type of the selected type: alternately, it may be generated by said selected device and transmitted as display data to said display device. With this latter arrangement, the display device is not required to either hold or acquire data defining the simulacra and related functionality—it simply needs to support the display of remotely originating icons or simulacra and be configured to indicate to their originating device when they have been selected by a user.

Figure 2:
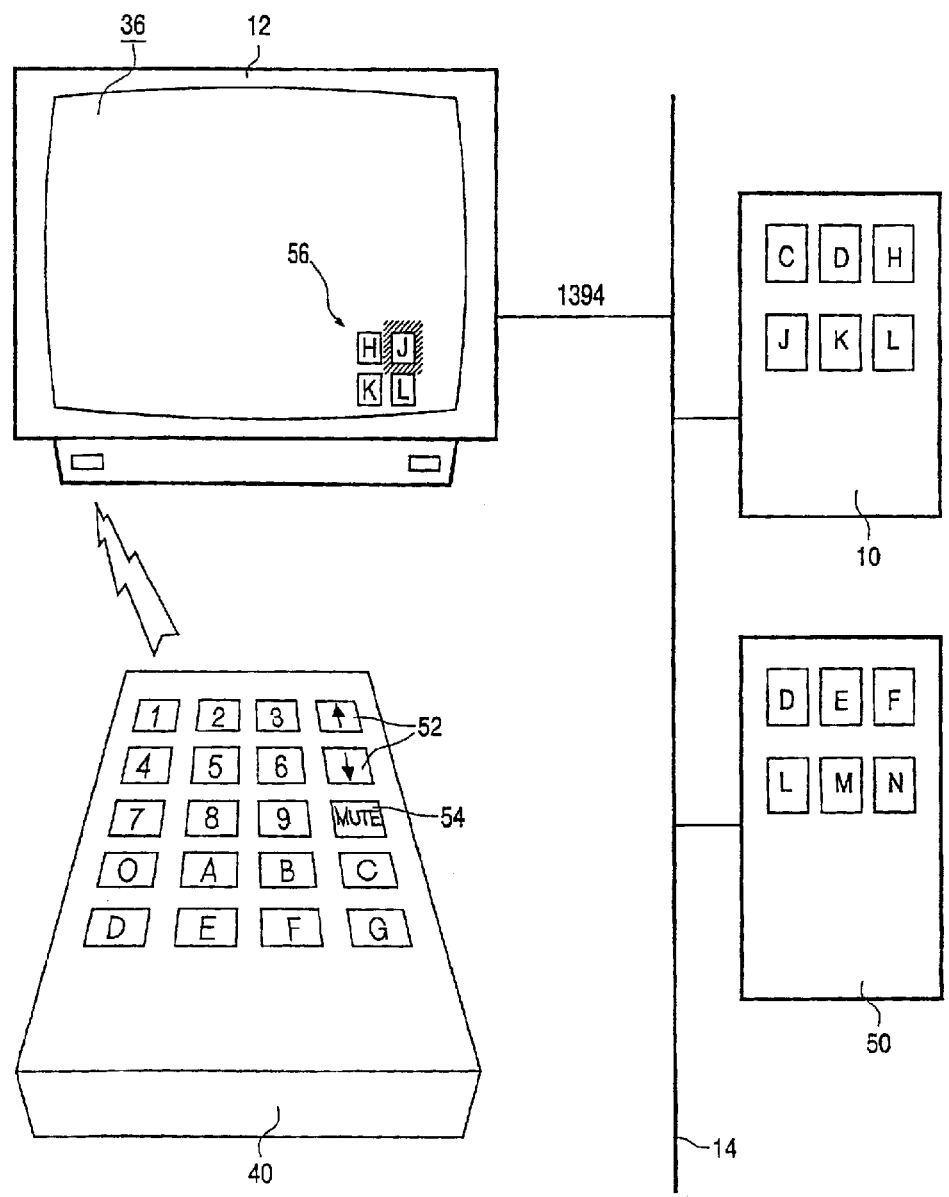
Figure 3:
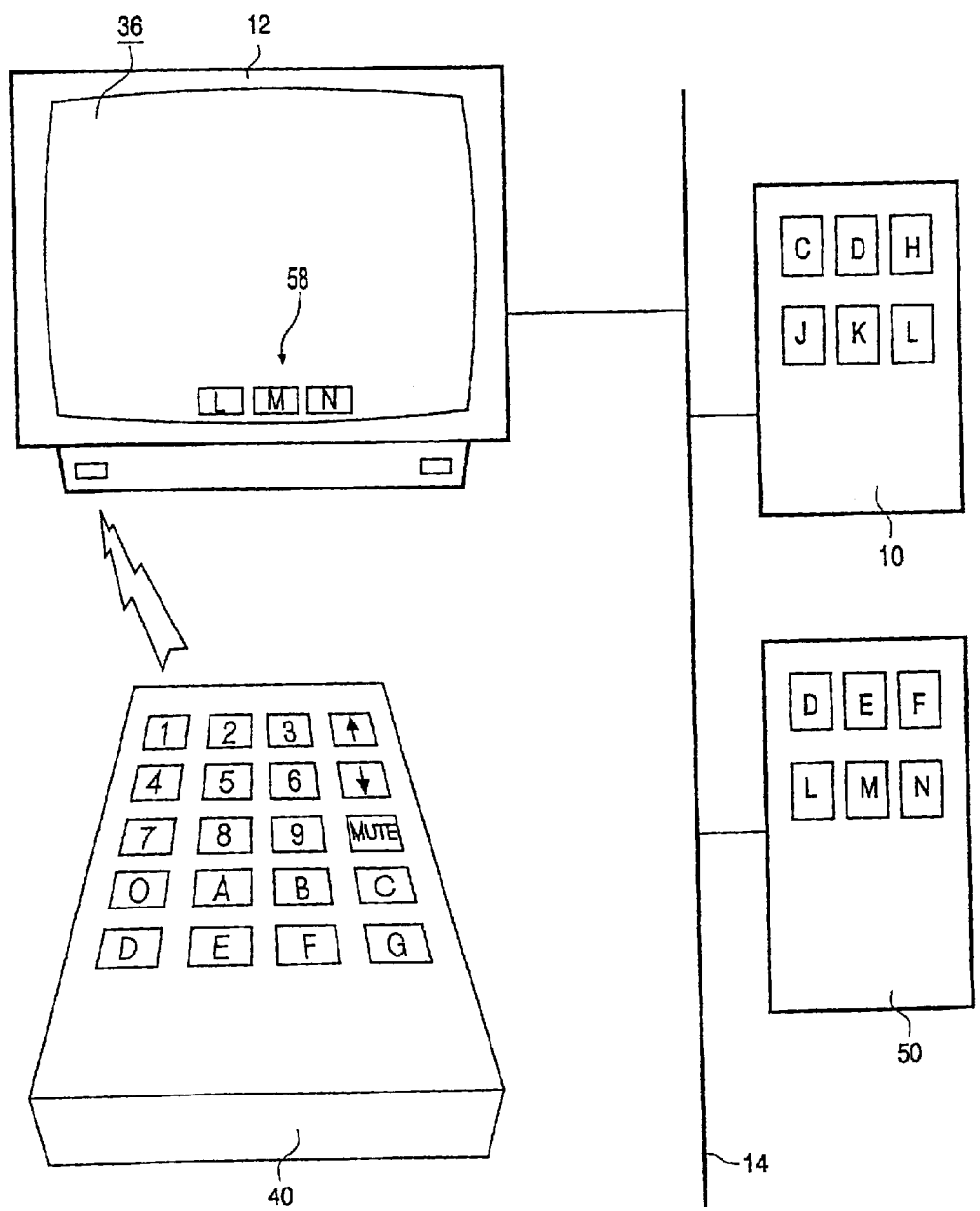

Further features and advantages of the present invention are defined in the attached claims (the disclosure of which is incorporated herein by reference) or will become apparent from reading of the description of preferred embodiments of the invention, given by way of example only and with reference to the accompanying drawings, in which:

FIG. 1 represents a digital versatile disc (DVD) player and digital television (DTV) coupled by data link;

FIG. 2 schematically represents the provision of virtual controls from a first selected device in an interconnected system; and FIG. 3 shows the change in generated virtual controls when a different device in the arrangement of FIG. 2 is selected.

A first arrangement of interconnected devices is shown in FIG. 1, with DVD player 10 and DTV 12 being linked via bus 14 supporting communication in accordance with IEEE Standard 1394 connect and communications protocols. In the following example, reference is made to IEEE 1394, and the disclosure of the specification of this protocol is incorporated herein by reference. As will be recognised by the skilled reader, however, conformance with this or any other such protocol is not essential to the operation of the present invention.

The functional features of the DVD 10 include a presentation stage DVD PS16 which reads data from disc 18 and passes it via an encoder and decoder stage 20 to output through an interface 22 between the DVD player and the 1394 bus 14. From the bus 14, the interface 22 receives control commands which it passes to a navigation stage DVD NAV 24 (directing the reading of data via presentation stage PS 16), to a player set-up control 26 and optionally, where provided, to a panel subunit PSUnit 28. Control and display of control functions for the DVD player is via front panel display processor FPDP 30 and remote control device 32, with the display processor 30 being coupled to navigation 24 and set-up 26 stages.

Within DTV 12, video signals from the bus 14 are received by an interface 34 coupled to display screen 36. Also provided is a receiver RCR 38 for signals from a remote control device 40, which receiver is coupled to a command processor CPU 42 which handles not only internal control functions for the DTV 12, but also the generation of control commands to be sent to DVD 10. In dependence on the means selected for generation of virtual keys, a key renderer or panel subunit controller DVDK 44 may be provided, as will be described in more detail below. In the latter case, an asynchronous link 46 is provided from the subunit controller DVDK to interface 34.

As will now be described with reference to FIGS. 2 and 3, which schematically represents the DVD 10 and DTV 12 linked via bus 14 of FIG. 1, together with a further device 50 such as a satellite receiver, the interconnected devices provide a local communication system, wherein the display device 12 is arranged to display data from the other devices 10, 50 of the system. The remote control 40 for the DTV 12 carries a first group of controls, as shown by number keys 1 . . . 9, 0 together with up/down select keys 52, audio mute button 54 and seven further function keys indicated as A to G, which keys control respective operational functions of DTV 12, such as volume, contrast and so forth. Control logic of the system, suitably but not necessary provided by the DTV command processor 42 (FIG. 1), provides a selector means for identifying a selected device of the system 10, 12, 50 to be controlled by user operation of the remote control 40. In the example of FIG. 2, the selected device is the DVD player 10 which has operational functions illustrated as C, D, H, J, K, and L. The functions C and D are common to those supported by the DTV 12 (for example contrast and volume) and no additional controls are required on remote control 40 to operate these functions of the DVD 10 via the bus 14.

For the remaining control functions H, J, K, and L of DVD 10, the remote control 40 does not have a suitable control. Instead, control logic of the system (again optionally involving command processor 42, together with key renderer or panel subunit controller 44), provides a virtual control means to determine which operational functions of the user-selected device (DVD 10) do not have a corresponding control on the remote control 40. For these functions H, J, K, L, the control logic generates on the display 36 a user actuatable simulacrum—indicated generally at 56—of a control means for each such operational function. These simulacra 56 may be icons displayed on screen, optionally overlaying anything currently shown, and may be selected by means of the remote control 40, optionally being highlighted (as for J) as the user operates up/down keys 52 to step through the icons.

FIG. 3 illustrates the case where the selected device is satellite receiver 50. Here, device functions D, E, and F are shared with the DTV 12, and so only "new" functions L, M and N have simulacra generated on screen 36, as indicated at 58. As may be seen, function L is common to both DVD 10 and satellite receiver 50: whether any savings may be made in view of this will depend on how the simulacra are generated, as will be described below.

In order to generate the simulacra, there are three options, as follows:

1. Local DVD Key renderer in the DTV
2. Panel Subunit
3. DVD Player generates OSD for DVD-specific keys Option 1—Virtual DVD Keys generated locally in the DTV 12. These virtual extra keys are drawn by the DTV on the DTV screen 36 as shown at 56 in FIG. 2, with the user navigating with the DTV navigation keys 52. The benefits of this option are that the DTV knows which keys are on its Remote Control and therefore knows which virtual keys need to be provided on the screen. This allows a DTV manufacturer to put more DVD controls on a DTV RC if needed, but does not rely on the standardisation of a known set of DVD keys on the DTV Remote Control. Also, the virtual key display 56 can be moved around on the DTV screen 36 to suit the video content (like the "PIP Position" key).

Against these benefits is the requirement for implementation of a drawing engine for the DVD display and relatively tight restrictions on assigning meanings to different keystrokes and combinations of strokes.

Option 2—Panel Subunit. In this option, the look and layout for the extra keys (i.e. those DVD keys not present on the DTV RC) are described to the DTV by the Panel Subunit 28 in the DVD 10. The DTV draws the user interface on the screen (using the DTV's Panel Subunit Controller 44) and the user has to navigate using the DTV navigation keys.

This option has benefits in terms of better control over the look and layout of the display than option 1, together with support for manufacturer-specific keys and multi-function key combinations. As before, the virtual key display can be moved around on the DTV screen to suit the video content. Against this must be weighed the need for (and cost of) a panel subunit in the DVD Player and a panel subunit controller in the DTV.

Option 3—DVD Player generates OSD for DVD-specific keys. This uses the existing on-screen display (OSD) generator in the DVD player, the DVD generates its own menu or OSD which is rendered in the DVD memory and transferred as a bitmap to the DTV using the 1394 Asynchronous service. The user has to navigate with the DTV navigation keys.

The advantages of this arrangement are minimal impact on the DTV, no need for panel subunit, local key renderer, etc. Also, the DVD Player has complete control over display and uses the existing OSD generator in the DVD player. Multi-function key combinations (e.g. right arrow is also Fast Forward) may be defined by the DVD manufacturer.

Against this is the need for extra software in DVD Player, and the need for a bitmap to be generated in the DVD player's memory and transferred as a bitmap. Also, the virtual display is potentially much larger than the simple icon display, and it may not be possible for virtual key display to be moved around on the DTV screen to suit the video content.

From reading the present disclosure, other modifications and variations will be apparent to persons skilled in the art, including equivalents and features which are already known in the field of bus-connected and cordless communication systems and components and which may be used instead of or in addition to features already disclosed herein.

In the foregoing we have described a local communication system which comprises a plurality of devices interconnected for the communication of data. One of the devices is a display device arranged to display data from one or more other devices of the system, and one of said devices is a remote control carrying a first group of controls for controlling respective operational functions of a device of the system. The system is configured to identify a selected device of the system to be controlled by user operation of said remote control device, and to determine which operational functions of that selected device do not have a corresponding control on the remote control. For such functions, the system generates on the display device a user actuatable simulacrum of a control for that function.

What is claimed is:

1. A local communication system comprising a plurality of devices interconnected for the communication of data, wherein one of said devices is a display device arranged to display data from one or more other devices of the system, and wherein one of said devices is a remote control device carrying a first group of controls (A . . . G) for controlling respective operational functions of a device of the system, the system including:

selector means for identifying a selected device of the system to be controlled by user operation of said remote control device; and virtual control means to determine which operational functions (H . . . L) of said selected device do not have a corresponding control on said remote control device, and generate on said display device a user actuatable simulacrum of a control means for each such operational function.

2. A system as claimed in claim 1, wherein said simulacrum is generated by said display device based on data from said selected device.

3. A system as claimed in claim 1, wherein said simulacrum is generated by said display device by reference to stored data, which data is accessed by reference to the device typo of the selected device.

4. A system as claimed in claim 1, wherein said simulacrum is generated by said selected device and transmitted as display data to said display device.

5. A system as claimed in claim 1, wherein said remote control device has a corresponding control for all functions of said display device.

6. A system as claimed in claim 5, wherein said remote control device includes a control for selectively actuating a displayed simulacrum.

7. A system as claimed in claim 6, wherein said display device is arranged to display a plurality of simulacra and the remote control device comprises means for stepping through said simulacra and selecting one or more thereof.

8. A system as claimed in claim 1, wherein interconnection between two or more of the devices is provided by a wireless link.

9. A system as claimed in claim 1, wherein interconnection between two or more of said devices is via a digital data communication bus to which the devices are respectively interfaced, with said data being carried thereupon as discrete data packets.

10. Data processing apparatus comprising virtual control means in a system, said virtual control means configured according to claim 1.

* * * * *